United States Patent

[11] 3,575,381

[72] Inventor William C. Gilmore
Bradford, Pa.
[21] Appl. No. 754,888
[22] Filed Aug. 23, 1968
[45] Patented Apr. 20, 1971
[73] Assignee Dresser Industries, Inc.
Dallas, Tex.

[54] VALVE SEAT CONSTRUCTION
7 Claims, 3 Drawing Figs.
[52] U.S. Cl................................................ 251/359,
251/368
[51] Int. Cl..............................................F16k 51/00,
F16k 1/226
[50] Field of Search.......................................... 251/359,
368; 75/128.8 (Ti)

[56] References Cited
UNITED STATES PATENTS
1,692,966 11/1928 Treiber........................ 251/359X
2,101,970 12/1937 Wissler........................ 251/359X
2,641,540 6/1953 Mohling et al................ 75/128.8Ti
2,665,675 1/1954 Sheppard..................... 251/359X
2,677,610 5/1954 Evans, Jr..................... 75/128.8Ti
2,742,356 4/1956 Prasse et al.................. 251/368X
2,903,564 9/1959 Carr............................. 251/368X
3,204,927 9/1965 Killian......................... 251/359X
3,290,128 12/1966 Manganello et al. ......... 75/128.8Ti
3,309,242 3/1967 Pops............................ 75/128.8Ti Primary Examiner—Samuel Scott
Attorneys—Robert W. Mayer, Daniel Rubin, Peter J. Murphy, Frank S. Troidl, Roy L. Van Winkle and William E. Johnson, Jr.

ABSTRACT: A butterfly valve in which the seat is formed of a stainless steel ring fused to the valve body by casting the body about the prepositioned ring prior to the finished machining thereof.

Patented April 20, 1971 3,575,381
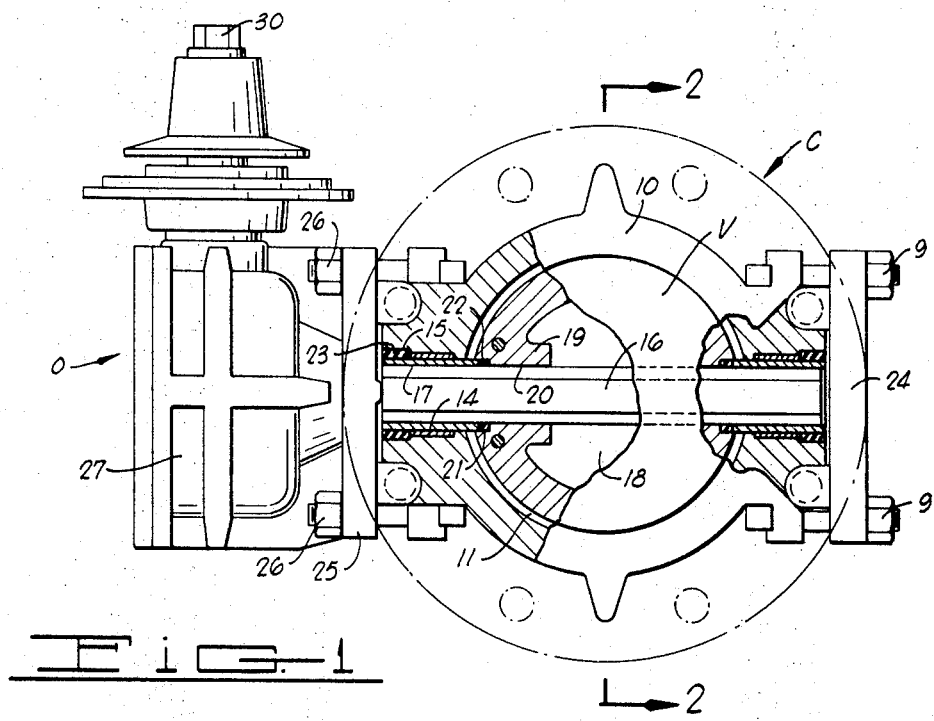
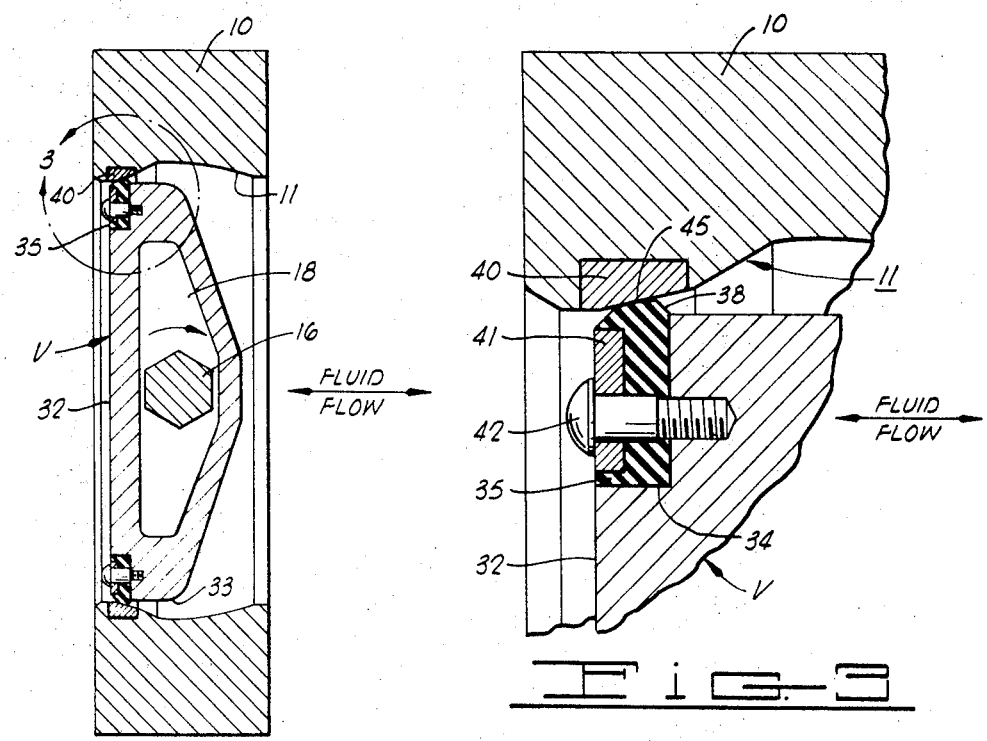
INVENTOR
WILLIAM C. GILMORE
BY Daniel Rubin
ATTORNEY

VALVE SEAT CONSTRUCTION

CROSS REFERENCES TO RELATED APPLICATIONS

"Valve Seat Construction," Ser. No. 631,225 filed Apr. 17, 1967, and Pat. No. 3,525,499 issued Aug. 25, 1970.

BACKGROUND OF THE INVENTION

1. The field of art to which the invention pertains includes "Valves and Valve Actuation" as contained in Patent Office class 251.

2. The prior art to which the invention is directed includes the art of butterfly valves being of a type in which a usually circular vane or disc is rotatable in the fluid passage between an open and closed position. When in the closed position, the vane engages a seat with which it cooperates to provide a seal against leakage of the pressurized line contents intended to be controlled by the valve. It is essential in valves of this type that the seal be effective on each occasion of valve closing for the life of the valve to continuously provide positive shutoff without frequent maintenance and servicing of the seat. Because the seat is commonly subjected to wearing conditions caused by factors such as wire drawing, corrosion, temperature changes, abrasions and the like, it is desirable to provide an ideal seat which is completely unaffected by these factors. Accordingly, it has long been recognized that the seat should comprise a hard, durable corrosion resistant material able to at least substantially retain its machine-finished surface to withstand normal and conventional conditions and provide trouble-free service for very prolonged operating periods. Previous efforts to achieve this result have included the use of premachined alloyed materials for the seat placed into the valve body as a production step subsequent to the casting of the valve body by cementing or the like. This has achieved only a limited success for a short time following manufacture because of the inability of the cement to maintain its bond for the life of the valve. Leakage occurs as the bond, affected by the adverse conditions of use, begins to fail, frequently after only a short time period of operative service. Cast fusing of the body to the seat ring has not been generally possible because of the difference in expansion coefficients between the body and seat materials, causing the ring to shrink away from the body during cooldown. A technique for effecting a cast fused bond between a seat material having a coefficient of thermal expansion approximately 50 percent greater than the body is disclosed in the aforementioned application "Valve Seat Construction" cross referenced herewith. This latter technique depends on surface bonding ratios found to be critical and by which the ring is locked against shrinkage pullout during the cooling stage.

SUMMARY OF THE INVENTION

This invention relates to valves and to the process of their manufacture. More particularly, the invention relates to butterfly valves and the process of producing butterfly valves in which a valve seat of hard, durable corrosion resistant material is fused to the valve body by casting the body about a preformed stainless steel sear ring prior to the finished machining thereof. In accordance with the invention, it has been discovered that a ring when of an austenitic stainless steel of critical composition can be readily cast fused to the body substantially uniform about its perimeter without the need for special techniques to prevent pullout caused by shrinkage differentials. Hence, there has now been discovered for the first time how a corrosion resistant stainless steel can be successfully fused to a cast iron valve body without the attendant difficulties or special techniques that have existed in prior art devices as not above to result in a more troublefree valve of greater reliability with reduced maintenance requirements than heretofore. While specifically useful in connection with valves of the butterfly type, it is to be understood the invention can likewise be employed in the manufacture of other valve types such as gate valves, plug valves, ball valves or the like in which it is customary to have a seat engaged by a closure member.

It is therefore an object of the invention to provide a valve having a superior seat construction than heretofore.

It is a further object os the invention to provide a novel valve having a durable, corrosion resistant seat ring material such as stainless steel cast fused in a valve body such as cast iron without the attendant special techniques previously required.

It is a still further object of the invention to provide improved butterfly valves in which the attendant problems heretofore as associated with the seat ring in the valve body are simply overcome economically and reliably.

Further objects, advantages and details will become apparent from the following description when read in conjunction with the accompanying drawings, in which:

FIG. 1 is a plan sectional view of a butterfly valve with parts partially broken away;

FIG. 2 is a sectional view taken substantially along the lines 2-2 of FIG. 1; and FIG. 3 is an enlarged view of the seat engaging surfaces encircled in FIG. 2.

Referring now to FIG. 1, there is illustrated an embodiment in the form of a butterfly valve which includes a housing or casing referred to generally by the reference character C. The casing includes an annular wall 10 to which is secured a seat generally referred to as 11 and formed in accordance with the invention as will be described below. At diametrically opposite points with respect to the seat, the wall 10 includes aligned cylindrical bores 13 sized to accommodate Teflon or the like antifriction bearing sleeves 14 and enlarged at their outer ends to provide counterbores 15. The main valves crossshaft is designated 16 and is of a noncircular formation throughout its length. Carried by the ends of shaft 16 within the bores 13 are corrosion resistant bearing sleeves 17, preferably of a corrosion proof material such as stainless steel. The sleeves each have a noncircular central bore corresponding to the shape of the shaft 16 to receive and complement the shaft therethrough as to constitute the driving connection between the shaft and the bearing sleeve. The outer surface of the sleeve is cylindrical and is journaled within the Teflon sleeve 14.

The vane, as can be seen also in FIG. 2, is referred to in its entirety by the reference character V. It includes a central cavity 18 through which the shaft 16 passes and is formed with an internal hub 19. The hubs in turn are formed with noncircular bores 20 corresponding to the cross section of the shaft 16 received therein to establish a driving connection between the shaft and van member.

At the outer end of each bore 20, there is included a counterbore 21 partially receiving the bearing sleeve 17 and a static seal 22 likewise fitted therein. Positioned in each counterbore 15 is an outer seal 23, which generally comprises rubber or other suitable elastomeric material, to prevent leakage of fluid from the interior of the housing. At one side, the seal is held in position by a cover plate 24 which is secured to the housing by means of bolts 9. The seal 23 on the other side is held in position in a similar manner by a base plate 25 associated with the valve operating mechanism and secured to the housing by bolts 26.

Mounted on the base plate 25 is a housing 27 for the valve operating mechanism generally designated as O. This latter housing defines a chamber in which the vane shaft 16 is received through base plate 25 for operatively opening and closing the valve via a wrench engaging member 30 all as more fully described in application Ser. No. 604,090 filed Oct. 31, 1966, entitled "Operating Mechanism for Butterfly Valve."

The vane and seat construction with which the invention hereof is concerned can be more readily understood with reference now to FIGS. 2 and 3. As thereshown, the van V includes a face 32, a generally circular periphery 33 and a notchlike recess 34 at its peripheral corner in which is secured a rubber or other suitable type gasket 35. The gasket has an outer rounded or beveled edge 38 which when the vane is in closed position engages seat ring 40 of seat 11 formed in accordance with the invention hereof and shown postmachined in a completed valve with a ground seat surface 45. A clamp means in the form of a ring 41 embeds against the backface of the gasket and a screw 42 passes through aligned openings to secure the gasket to the vane. As illustrated, the vane is positioned to close the valve against fluid flow. When the van is rotated through a 90° angular displacement by means of operating mechanism O, the valve is opened to its maximum flow position.

In accordance with the invention, the body is of a cast material such as ductile iron or cast iron. Preferably the body material is a commercial grade cast iron such as $A$ 126 or $A$ 48. Each of these materials have thermal coefficients of expansion of about $6.0 \times 10^{16}$ inches per inch per degree F. and melting points approximately in the range of 2000° F. to 2200° F.

The seat material for use in the body is of a durable, highly corrosion proof stainless steel composition. For use in a butterfly valve the seat is preformed as an annular ring either internally premachined or adapted for a post-casting finish machining operation. Critical to supporting the seat cast fused to the body, it has been discovered that by employing an austenitic stainless steel having minimum by weight proportions based on the total weight of the stainless steel alloy of about from 4—8 percent nickel and about from 16—18 percent chromium combined with ingredients having produced precipitation hardening such as copper, titanium, aluminum and/or beryllium the requirements of durability and corrosion resistance are readily satisfied. In addition to the nickel and chromium percentage given the composition contains by weight from about 1.3 percent to about 1.5 percent titanium, less than 1 percent carbon, less than 2 percent manganese, less than 1 percent of each of phosphorus and sulfur, less than 2 percent silicon, less than 1 percent aluminum and the remainder being essentially iron. Nickel can, in part, be replaced with copper in an amount insufficient to alter the basic physical properties of the alloy, e.g., the coefficients of thermal expansion, and titanium can on the same basis as the nickel be replaced at least in part with columbium Such a stainless steel composition as above is characterized by a melting point range of about from 2550°—2650° F. and in relation to cast iron has a mean coefficient of thermal expansion as follows:

|  | 32°–212° F. | 32°–572° F. | 32°–932° F. | 1,800° F. |
| --- | --- | --- | --- | --- |
| S.S. alloy | 5.5 | 6.2 | 6.3 | 11 |
| Cast iron | 5.6 | 6.6 | 7.2 | 9.4 |

At temperatures above about 1200° F., the stainless has an expansion coefficient greater than cast iron but below 1200° F. has an expansion coefficient at least marginally less than cast iron. Accordingly, during cooldown immediately after casting, the stainless tends to pull away from the cast iron in a manner comparable to more conventional grades of stainless and continues to do so until cooling to about 1200° F. Surprisingly, however, the reversal in relation of expansion coefficients below 1200° F. effects a healing of the bond despite both metals being less plastic and, therefore, less amenable to fusion bonding. Consequently, whereas the unbondable characteristics at high temperature would seem to negative an ultimate fusion bond between the metals, there, in fact, results a very positive bond commercially suitable for valves and the like.

A material fulfilling these characteristics is commercially marketed under the trademark Stainless $W$. This is reported by the manufacturer as having by weight proportions in the final alloy of from about 6 percent to about 7.5 percent nickel; from about 16.5 percent to about 17.5 percent chromium; titanium from about 0.4 percent to about 1.2 percent; aluminum from about 0.4 percent to about 1 percent; carbon of less than 0.1 percent; manganese of about 1 percent; phosphorus and sulfur each of less than 0.1 percent; silicon of about 1 percent and the remainder essentially of iron.

With the critical match afforded by these selected materials during casting the iron will be molten at a temperature below that of the seat and during cooldown a fusing bond is ultimately effected substantially uniform along their surfaces of mutual contact. The result is repeatedly reproducible while avoiding relative geometric parameters previously considered critical in obtaining a similarly effective bond. At the same time the bond which is achieved is far superior in terms of product reliability than that previously obtained with cementing techniques. Not only does such a ring and seat combination result in a more reliably superior product but, because of the elimination in required critical geometric relations between them, production costs are substantially reduced.

By the above description there is disclosed a novel valve construction providing a seat having increased wear and corrosion resistant properties over that of the body in which it is contained and yet cast fused thereto for a reliable long life bond. This result can be achieved by employing limiting aforementioned critically alloyed stainless steel producing the desirable thermal properties while also having the wear and corrosion properties which are so essential.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. In a pipeline service valve including a cast body defining a fluid passage between an inlet and an outlet and a closure means operable to be interposed in said passage between a first position in which said passage is open to fluid flow and a second position in which said passage is closed to fluid flow, the improvement comprising:
    a. a seat of material different than said body to cooperate with said closure means when in said second position,
    b. said seat being cast fused bonded to said body and of a corrosion resistant alloy material having a higher melting temperature than said body material and a mean coefficient of thermal expansion which is less than that of the body material through at least a portion of the cooldown temperature range below the molten temperature of said body material.

2. In a valve according to claim 1 in which said body is cast iron and said seat is of a chromium nickel stainless steel.

3. In the valve according to claim 2 in which said stainless steel has a mean coefficient of thermal expansion greater than said body material at the molten temperature of said body material and less than said body material at room temperature.

4. In the valve according to claim 2 in which said seat is an annular ring cast fused to said body.

5. In the valve according to claim 4 in which said seat material is a preannealed precipitation hardened alloy having by weight about at least 4 percent nickel, and about at least 16 percent chromium.

6. In the valve according to claim 4 in which said seat material consists essentially of proportions by weight on the total alloy weight of from about 4 percent to about 8 percent nickel, from about 16 percent to about 18 percent chromium, from about 1.3 percent to about 1.5 percent titanium, less than 1 percent carbon, less than 2 percent manganese, less than 1 percent of each of phosphorous and sulfur, less than 2 percent silicon, less than 1 percent aluminum and the remainder being essentially iron.

7. In the valve according to claim 4 in which said seat material consists essentially of proportions by weight on the total alloy weight of from about 6 percent to about 7.5 percent nickel, from about 16.5 percent to about 17.5 percent chromium, from about 0.4 percent to about 1.2 percent titanium, from about 0.4 percent to about 1 percent aluminum, less than 0.1 percent carbon, about 1 percent manganese, phosphorous and sulfur each of less than 0.1 percent, silicon of about 1 percent, and the remainder being essentially iron.